US006724643B1

(12) United States Patent
Gibbs (10) Patent No.: US 6,724,643 B1
(45) Date of Patent: Apr. 20, 2004

(54) CONTROL SYSTEM AND METHOD EMPLOYING ACTIVE TEMPERATURE BALANCE FOR CONTROLLING RECTIFIER BRIDGE

(75) Inventor: Irving A. Gibbs, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/325,246

(22) Filed: Dec. 20, 2002

(51) Int. Cl.[7] .............................................. H02H 7/125
(52) U.S. Cl. .............................. 363/54; 363/69; 363/70
(58) Field of Search ................................ 361/103, 93.8; 363/69, 70, 54

(56) References Cited

U.S. PATENT DOCUMENTS

| 5,963,440 | A | 10/1999 | Gibbs et al. |
| 5,963,441 | A | 10/1999 | Gibbs et al. |
| 6,046,917 | A | 4/2000 | Gibbs et al. |
| 6,208,120 | B1 | 3/2001 | Gibbs |
| 6,232,751 | B1 | 5/2001 | Farr et al. |
| 6,614,639 | B1 * | 9/2003 | Gibbs ........................ 361/103 |

OTHER PUBLICATIONS

Irving A. Gibbs et al., "Active Current Balance Between Parallel Thyristors in Multi–Bridge AC–DC Rectifiers", 7 pp., IEEE, 2001. No month.

* cited by examiner

Primary Examiner—Shawn Riley
(74) Attorney, Agent, or Firm—Martin J. Moran (57) ABSTRACT

A method for controlling a parallel array of rectifier bridges includes outputting control signals to repetitively fire bridge elements; skipping repetitive firing of the elements for one out of plural counts; sensing temperatures of the elements; averaging some of the sensed temperatures to provide a corresponding average temperature for each of the parallel bridge elements; comparing one of the sensed temperatures to the corresponding average temperature; increasing the counts when the sensed temperature of one of the elements is less than the corresponding average temperature, or decreasing the counts when the sensed temperature of the one of the elements is greater than the corresponding average temperature; and setting the counts to a first predetermined value when the sensed temperature of the one of the elements is greater than a second predetermined value above the corresponding average temperature.

26 Claims, 6 Drawing Sheets

CONTROL SYSTEM AND METHOD EMPLOYING ACTIVE TEMPERATURE BALANCE FOR CONTROLLING RECTIFIER BRIDGE

BACKGROUND OF THE INVENTION

1. Field of the Invention

The present invention relates to control systems and, more particularly, to control of rectifiers employing semiconductor devices, such as silicon controlled rectifiers (SCRs) or thyristors. The invention also relates to a method for controlling a rectifier bridge.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle. Examples of such circuits are disclosed in U.S. Pat. Nos. 5,963,440; 5,963,441; 6,046,917; 6,208,120; and 6,232,751.

It is not uncommon for a plurality of SCR bridges to be operated in parallel with each of the corresponding bridge firing control circuits being controlled by a central firing control circuit. The central firing control circuit manages each of the bridge firing control circuits in order that the corresponding rectifiers in each of the parallel bridges conduct current at the same point in the AC waveform.

SCR bridges are commonly employed in an excitation control system to provide field excitation for a rotating electrical apparatus (e.g., large synchronous generators and motors, utility synchronous generators and motors, industrial synchronous motors and generators, synchronous generators and motors for naval or other shipping applications, synchronous generators and motors for oil well drilling rigs).

A bridge converter may include two or more parallel bridges. Each one of these bridges is configured in parallel with the other one or more bridges, in order that they share the load current.

U.S. Pat. No. 5,963,441 discloses a "skip firing" SCR control method, which is employed to control the current balance in parallel devices to obtain the desired effect. The basic principle is to control the average current of an element by "not firing" the element a controlled number of times or by varying the point at which the element fires. Because of the large inductance of the load on parallel bridges, establishing or controlling appropriate duty cycles for the individual bridges by skipping cycles or adjusting the cycles does not introduce appreciable disturbance in the load current. In turn, skip firing can be used to control the average current balance in parallel cells or can be used to unbalance a system to compensate for an element that is heating up.

Bridge firing control (BFC) circuits, which communicate with a central firing control circuit or exciter firing control (EFC), determine the average current for each cell and send those results to the EFC. Sensors, such as resistance temperature devices, may be employed to sense heat sink temperatures for the individual bridge segments associated with each, SCR. Those temperatures may be recorded and, then, sent to the EFC. Algorithms in the EFC calculate when and how often each cell in each bridge should not be fired or have its firing period advanced or retarded. In turn, the EFC sends this information (i.e., the "skip firing code") over a communication bus to the BFCs. Each of the BFCs then skip fires based on the skip firing code (e.g., how many cycles to skip, how those cycles are to be distributed over a time interval, and how those skips are timed so as not to skip simultaneously the corresponding segment on any other bridge). The process continues with the collection of more data and subsequent modification to the skip firing code by the EFC.

U.S. Pat. No. 5,963,440 discloses employing skip firing to achieve current balance between cells. Over a given time interval, bridge firing control (BFC) circuits measure the current in each cell in the bridges. At the end of a time interval, the average current for each cell is calculated and sent to the central firing control circuit or EFC. Heat sink temperatures are also recorded from the sensors or resistance temperature devices. The recorded information is sent to the EFC. Algorithms in the EFC calculate when and how often each cell in each bridge should not be fired or have its firing period advanced or retarded. The EFC sends this information, the "skip firing code," over a communication bus to the BFC circuits, each of which then skip fires based on the "skip firing code". The process continues with the collection of more data and subsequent modification to the "skip firing code" by the EFC.

The "skip firing code" is a code designed to be sent to each BFC by the EFC over the communication bus. The code is designed to tell each bridge how many cycles to skip and how those cycles are to be distributed over a time interval.

There is room for improvement in control systems and methods for controlling rectifier bridges.

SUMMARY OF THE INVENTION

This need and others are met by the present invention, which employs an active temperature balance algorithm for controlling signals to elements or semiconductor devices, such as a thyristors or SCRs, of parallel rectifier bridges, in order to balance the temperatures of the parallel elements. This is accomplished by averaging sensed temperatures to provide a corresponding average (or "fair share") temperature for each of the parallel elements of the rectifier bridges, comparing one of the input sensed temperatures to the corresponding average temperature, skipping repetitive firing of at least one of the elements for one out of a plurality of counts, increasing the counts when the sensed temperature of one of the at least one of the elements is less than the corresponding average temperature or decreasing the counts when the sensed temperature of the one of the at least one of the elements is greater than the corresponding average temperature, and setting the counts to a first predetermined value when the input sensed temperature of the one of the at least one of the elements is greater than a second predetermined value above the corresponding average temperature.

As one aspect of the invention, a control system comprises: a firing control circuit outputting a plurality of firing commands; a parallel array of a plurality of rectifier bridges, each of the: rectifier bridges converting a plurality of alternating current voltages from a plurality of alternating current phases to a voltage, each of the rectifier bridges comprising a plurality of segments, each of the segments having an element, each of the elements of one of the rectifier bridges having a temperature and being electrically interconnected in parallel with at least a corresponding one of the elements of the other of the rectifier bridges; a plurality of temperature sensors, each of the temperature sensors sensing the temperature of a corresponding one of the elements; a plurality of bridge control circuits, each of the bridge control circuits inputting one of the firing commands, outputting a plurality of control signals responsive to the one of the firing commands to repetitively fire at least some of the elements of a corresponding one of the rectifier bridges, and inputting the sensed temperatures of the elements of the corresponding one of the rectifier bridges; a communication channel communicating the input sensed temperatures from the bridge control circuits to the firing control circuit, and communicating the firing commands from the firing control circuit to the bridge control circuits; and an output having the voltage, wherein the firing control circuit includes means for averaging some of the input sensed temperatures to provide a corresponding average temperature for each of the parallel elements of the rectifier bridges, for comparing one of the input sensed temperatures to the corresponding average temperature, for skipping repetitive firing of at least one of the elements for one out of a plurality of counts, for increasing the counts when the input sensed temperature of one of the at least one of the elements is less than the corresponding average temperature or for decreasing the counts when the input sensed temperature of the one of the at least one of the elements is greater than the corresponding average temperature, and for setting the counts to a first predetermined value when the input sensed temperature of the one of the at least one of the elements is greater than a second predetermined value above the corresponding average temperature.

The means for averaging may include a processor and a routine setting the counts to the first predetermined value when a count of the counts is greater than the first predetermined value. The means for averaging may include a processor and a routine to compare each of the input sensed temperatures to a threshold temperature and to responsively enable the increasing or the decreasing whenever any of the input sensed temperatures exceeds the threshold temperature.

The means for averaging may include a processor and a routine to increment the counts by one when the input sensed temperature of the one of the at least one of the elements is less than the corresponding average temperature. The means for averaging may include a processor and a routine to decrement the counts by one when the input sensed temperature of the one of the at least one of the elements is greater than the corresponding average temperature.

The routine may disable repetitive firing of the at least one of the elements when a count of the counts is a maximum value.

As another aspect of the invention, a method controls a parallel array of a plurality of rectifier bridges, each of which converts a plurality of alternating current voltages from a plurality of alternating current phases to a voltage, and each of which comprises a plurality of segments, each of the segments has an element, each of the elements of one of the rectifier bridges has a temperature, is electrically interconnected in parallel with at least a corresponding one of the elements of the other of the rectifier bridges, and is responsive to a control signal. The method comprises: outputting the control signals to repetitively fire the elements; skipping repetitive firing of at least one of the elements for one out of a plurality of counts; sensing the temperatures of the elements; averaging some of the sensed temperatures to provide a corresponding average temperature for each of the parallel elements of the rectifier bridges; comparing one of the sensed temperatures to the corresponding average temperature; increasing the counts when the sensed temperature of one of the at least one of the elements is less than the corresponding average temperature, or decreasing the counts when the sensed temperature of the one of the at least one of the elements is greater than the, corresponding average temperature; and setting the counts to a first predetermined value when the sensed temperature of the one of the at least one of the elements is greater than a second predetermined value above the corresponding average temperature.

The method may further comprise setting the counts to the first predetermined value when a count of the counts is greater than the first predetermined value.

The method may compare each of the sensed temperatures to a threshold temperature and conditionally start the decreasing or the increasing whenever any of the sensed temperatures exceeds the threshold temperature. The method may disable the skipping until after any of the sensed temperatures exceeds the threshold temperature.

The method may further comprise incrementing the counts by one when the sensed temperature of the one of the at least one of the elements is less than the corresponding average temperature, or decrementing the counts by one when the sensed temperature of the one of the at least one of the elements is greater than the corresponding average temperature.

The method may enable the skipping after any of the sensed temperatures exceeds the threshold temperature and independent of any subsequent sensed temperatures.

As another aspect of the invention, the method comprises: outputting the control signals to repetitively fire the elements; skipping repetitive firing of at least one of the elements at a skip frequency; sensing the temperatures of the elements; averaging some of the sensed temperatures to provide a corresponding average temperature for each of the parallel elements of the rectifier bridges; comparing one of the sensed temperatures to the corresponding average temperature; decreasing the skip frequency when the sensed temperature of one of the at least one of the elements is less than the corresponding average temperature, or increasing the skip frequency when the sensed temperature of the one of the at least one of the elements is greater than the corresponding average temperature; and setting the skip frequency to a predetermined skip frequency value when the sensed temperature of the one of the at least one of the elements is greater than a predetermined value above the corresponding average temperature.

The method may further comprise setting the skip frequency to the predetermined skip frequency value when the skip frequency is less than the predetermined skip frequency value.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a bridge rectifier for an excitation control system, although the invention is applicable to a wide range of control systems and methods for controlling rectifier bridges.

Figure 1:
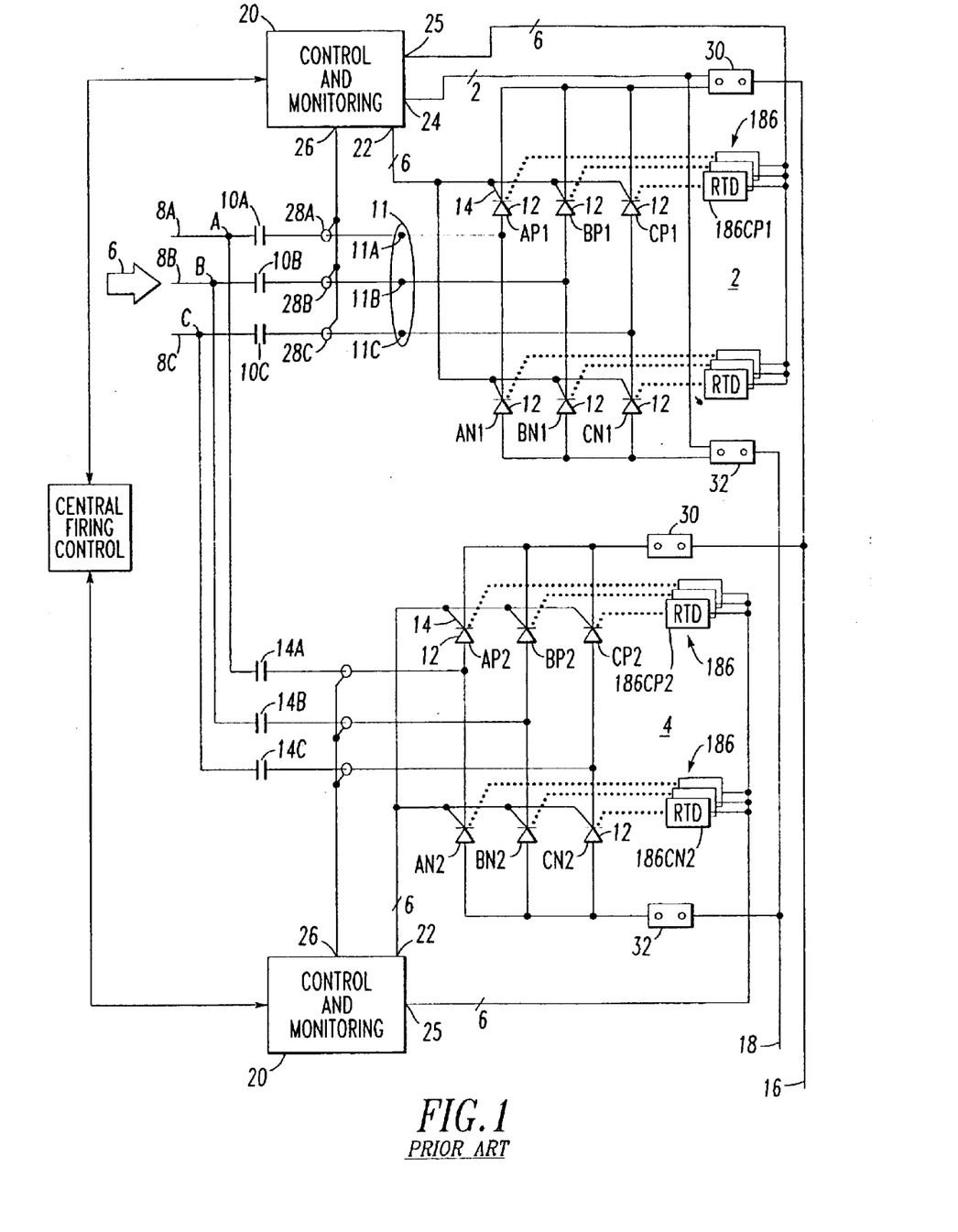
FIG. 1 is a circuit block diagram of two, three-phase, SCR bridges which are fed from a common three-phase source and are connected in parallel to provide an additive current output.

Bridges of semiconductor controlled rectifiers (SCRs) or thyristors are generally employed to convert alternating current (AC) sinusoidal signal waveforms to direct current (DC). As shown in FIG. 1, two controlled rectifier bridges 2,4 are connected in parallel. Each, of the bridges 2,4 receives a multi-phase current input from a common AC source 6 (e.g., a motor generator, field transformer, power potential transformer (PPT)). A three-phase current input is employed in this example, although the invention is applicable to a wide range of phase counts. The several phases of input current, shown as 8A, 8B and 8C, are fed through contacts (e.g., circuit interrupter separable contacts; fuses) 10A,10B and 10C, and 14A,14B and 14C, respectively, to rectifying segments on the two respective bridges 2,4. As shown with the bridge 2, three inputs 11, including 11A, 11B,11C, are electrically interconnected with corresponding alternating current phases A,B,C by the contacts 10A,10B, 10C, respectively.

The exemplary bridges 2,4 each have six cells or segments, one for each polarity of each of the phase currents 8A,8B,8C, although the invention is applicable to a wide range of segment counts. For example, segment AP1 refers to the positive polarity of phase A in the first bridge 2, while segment AN1 refers to the negative polarity of phase A in that first bridge 2. The remaining segments of the first and second bridges 2,4 are noted in a similar manner by reference characters BP1,BN1,CP1,CN1 and AP2,AN2,BP2, BN2,CP2,CN2.

Each bridge segment includes its own element, such as the exemplary SCR 12, that has a firing input (or gate) 14. When a suitable control signal is provided to one of the inputs 14, the corresponding SCR fires to, thereby, control current conduction (e.g., by starting or initiating current conduction) within the corresponding segment. Typically, the individual segments of each of the bridges 2,4 are fired every 60° of the AC cycle in the order: APn,CNn,BPn,ANn,CPn,BNn (where, for convenience of reference, APn, for example, refers to either AP1 or AP2). One of the SCRs 12 does not stop conducting until it is reversed biased. All of the positive rectifier output currents are summed together and the negative rectifier output currents are similarly summed and conveyed by corresponding positive and negative conductors 16,18 to a load (not shown). Typically, the bridges 2,4 include one or more heat sinks (not shown) for the SCRs 12.

An exemplary microprocessor-based control and monitoring circuit 20 has six control outputs 22, which are interconnected with the six firing inputs 14 of the SCRs 12, for outputting control signals to the segments AP1,BP1,CP1, AN1,BN1, CN1 to control current conduction within those segments, and various monitoring inputs 24,25,26. The six control outputs 22 include six digital logic control signals each of which controls current conduction within a corresponding one of the segments. The circuit 20 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=100001$_2$, followed by firing CNn and BPn with the firing code= 100010$_2$).

Monitors 28A,28B,28C provide conduction monitor signals to the inputs 26 for the three AC phases A,B,C. The monitors 28A,28B,28C monitor the respective phases A,B,C to provide corresponding conduction signals. The control and monitoring circuits 20 also input current signals from the shunts 30,32 and use that information to control the output of the respective bridges 2,4 through DC contact actuators (not shown). As shown with the bridge 2, the shunt 30, which is a first current sensor for the positive output of the bridge 2, senses current passing through the segments AP1,BP1,CP1 for the positive polarity of the AC phases A,B,C. Similarly, the shunt 32, which is a second current sensor for the negative output of the bridge 2, senses current passing through the segments AN1,BN1,CN1 for the negative polarity of the AC phases A,B,C. In turn, the sensors 30,32 provide corresponding current signals to the two inputs 24 of the control and monitoring circuit 20.

As disclosed in U.S. Pat. No. 5,963,441, preferably, the monitors 28A,28B,28C are conduction monitors which output conduction monitor signals as four-state logic signals having a first state (e.g., 10$_2$) representative of the positive polarity of the AC input current 8A,8B,8C; a second state (e.g., 01$_2$) representative of the negative polarity of the AC input current; a third state (e.g., 00$_2$) representative of about zero AC input current; and a fourth state (e.g., 11$_2$) representative of failure of the monitor. Alternatively, the conduction monitors 28A,28B,28C are current sensing mechanisms, such as current transformers, which output a first state (e.g., a first range of positive values) of the conduction signal representative of the positive polarity of the AC input current, and a second state (e.g., a second range of negative values) of the conduction signal representative of the negative polarity of the AC input current. In this embodiment, a control and monitoring circuit (not shown) inputs the three analog conduction signals at the three corresponding inputs, converts those analog inputs to plural-bit digital form (e.g., through a suitable n-bit analog-to-digital converter), and then converts the digital representation of the analog conduction signal to the first state (e.g., 10$_2$, which is representative of positive AC input current), the second state (e.g., 01$_2$, Which is representative of negative AC input current), or the third state (e.g., 00$_2$, which is representative of about zero AC input current plus or minus a suitable deadband). It will be appreciated that since the exemplary control and monitoring circuit 20 for bridge 2 employs four-state logic signals, and need not perform analog-to-digital conversions, that a simpler and more economical circuit is 20 possible. It will be appreciated that a wide range of alternative conduction monitors may be employed (e.g., a current sensor; a shunt with a suitable isolation device to provide a suitable sensed current value).

Figure 2:
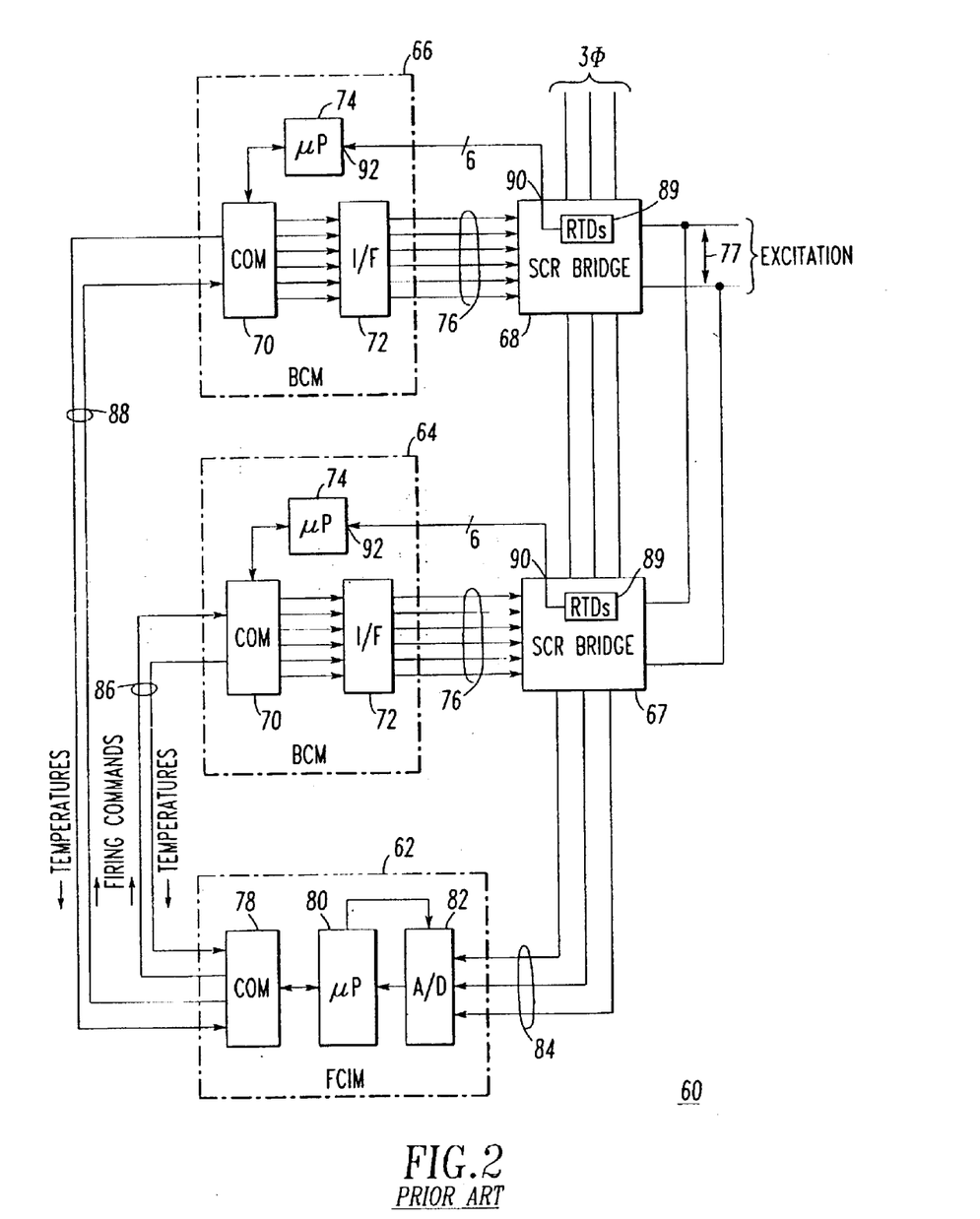
FIG. 2 is a block diagram of a firing control interface module (FCIM) and two bridge control modules (BCMs).

FIG. 2 is a block diagram of a control system 60 including a firing control interface module (FCIM) 62 and two bridge control modules (BCMs) 64,66 for respective SCR bridges 67,68. Each of the BCMs 64,66 includes a suitable communications interface (COM) 70, an interface (I/F) 72 to the corresponding bridge 67,68, and a suitable microprocessor ($\mu$P) 74. The COM 70 and $\mu$P 74 cooperate to send six exemplary firing pulses 76 to all of the segments in the corresponding bridge 67,68. The SCR bridges 67,68 output a rectified voltage 77.

The SCR bridge 67, for example, has its own BCM 64, which communicates with the FCIM 62. The FCIM 62 monitors the input voltage to the bridges 67,68 and also communicates with the other BCM 66. Although two exemplary bridges 67,68 are shown, one, three, or more parallel bridges may employed. It will be appreciated that the FCLM 62 controls and communicates with additional bridges in a similar manner.

The FCIM 62 includes a suitable communications interface (COM) 78, a suitable microprocessor ($\mu$P) 80, and an A/D converter 82 which samples the voltages of the three phases 84 through a suitable interface (not shown). The COM 78 of the FCIM 62 communicates with the COMs 70 of the BCMs 64,66 through suitable communication channels 86,88, respectively. In this manner, the FCIM 62 controls the BCMs 64,66 through the corresponding communication channels.

Each of the bridges 67,68 includes a plurality of RTDs 89 (e.g., one or more RTDs for each of the bridge SCRs (not shown)). In turn, the RTDs 89 have RTD outputs 90, which are electrically connected with corresponding analog-to-digital converter inputs 92 of the corresponding BCM $\mu$Ps 74.

Figure 3:
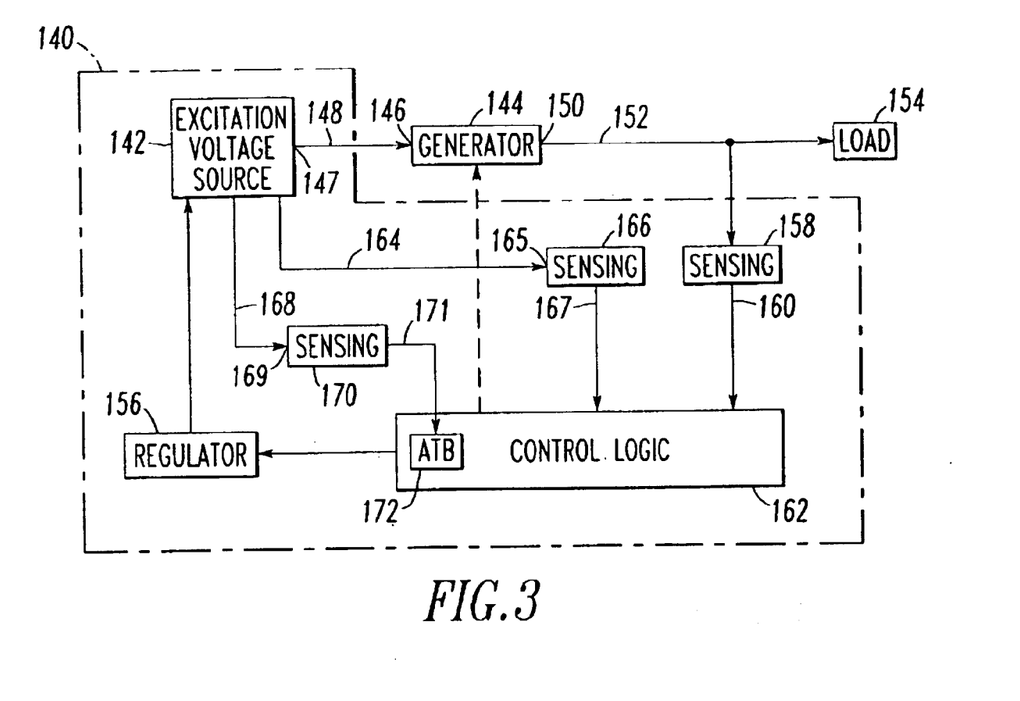
FIG. 3 is a block diagram of an excitation control system in accordance with the present invention.

FIG. 3 shows an excitation control system 140 including an excitation voltage source, such as a rectifier bridge 142. Examples of an excitation control system are disclosed in U.S. Pat. Nos. 6,208,120; and 6,232,751, which are incorporated by reference herein. The exemplary excitation control system 140 is for a rotating electrical apparatus, such as the exemplary generator 144. The generator 144 includes an input 146 responsive to an excitation voltage source output 147 having an excitation voltage 148, and an output 150 having one or more alternating current phases 152, each having a current flowing therein and a voltage, which supply power to a load 154. One or more circuit breakers (not shown) may be disposed between the generator 144 and the load 154. The excitation voltage source 142 provides the excitation voltage 148 to the input 146 of the generator 144. A regulator, such as a bridge control circuit 156 adapted to control the source 142, regulates the excitation voltage 148. A first sensing sub-system 158 for the alternating current phases 152 senses generator current and/or generator voltage and provides an electrical signal 160 (e.g., generator line current, generator watts) to control logic 162 for the regulator 156 and generator 144.

The excitation control system 140 employs the excitation voltage source 142, which in the exemplary embodiment is a three-phase rectifier circuit, to convert alternating current (AC) sinusoidal signal waveforms to direct current (DC). The three-phase rectifier circuit 142 includes a plurality of semiconductor devices, such as thyristors or SCRs. The semiconductor devices are disposed in bridge segments, with typically one thyristor or SCR for each polarity of each AC phase. The regulator 156 includes a bridge firing control circuit (not shown) to control the firing point for each thyristor or SCR in each AC cycle.

The excitation voltage source 142 has an AC input 164, which is connected to an input 165 of a suitable sensing circuit 166, which provides conduction monitor sensor signals 167 to the control logic 162. The excitation voltage source 142 has a plurality of RTD outputs 168, which are connected to inputs 169 of a suitable temperature sensing circuit 170, which provides temperature signals 171 to an active temperature balance (ATB) circuit 172 of the control logic 162.

For example, the communication channel 86 may send six RTD temperature measurements from the BCM 64 to the FCIM 62, and may send six skip fire values from the FCIM 62 to the BCM 64 of FIG. 2. In a similar fashion, the communication channel 88 may send six RTD temperature measurements from the BCM 66 to the FCIM 62, and may send six skip fire values from the FCIM 62 to the BCM 66. The RTDs, such as 186CP2 and 186CN2 of FIG. 1, are associated with corresponding SCRs, such as CP2 and CN2.

Figure 4:
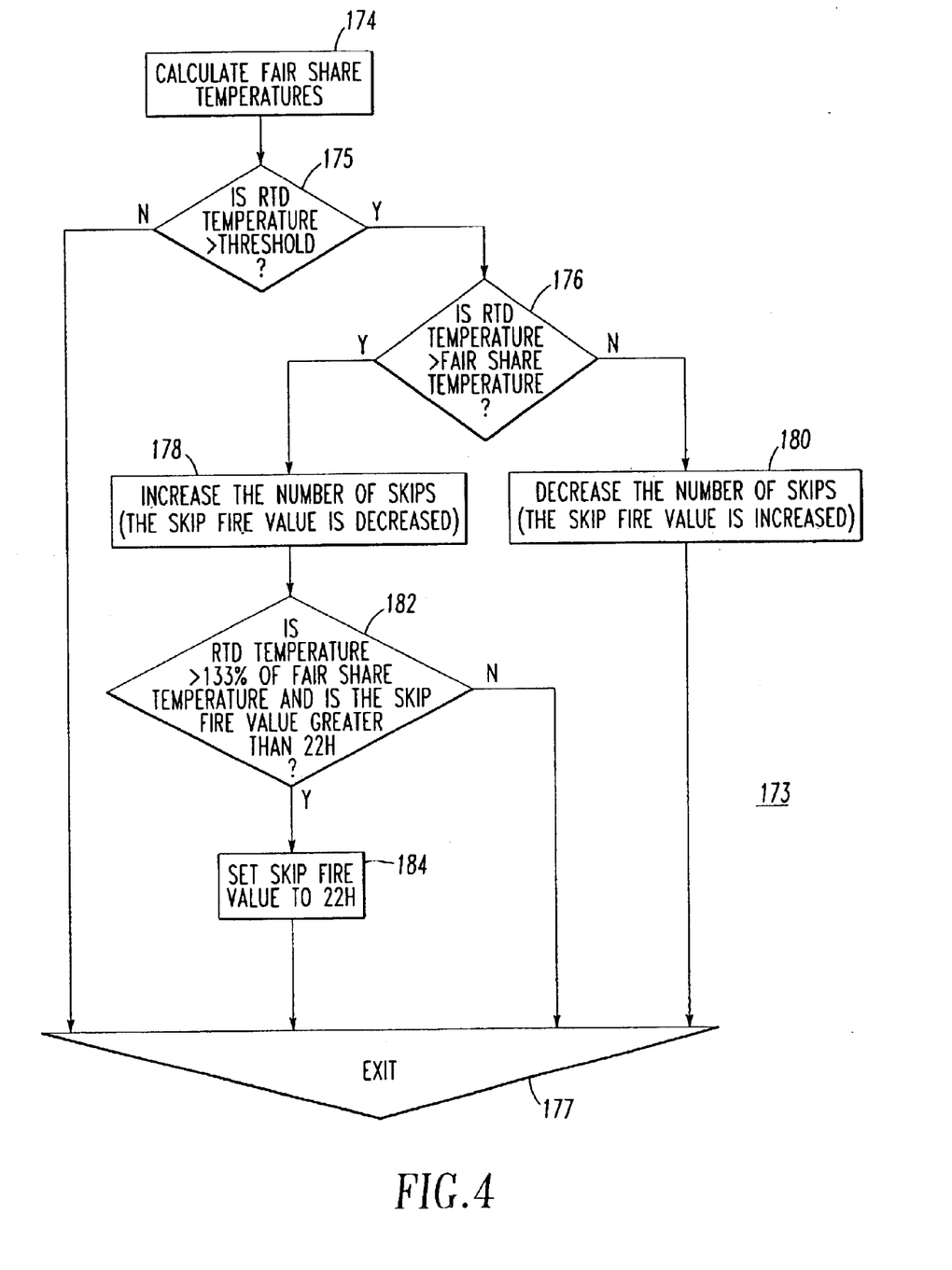
FIG. 4 is a simplified flow chart of an active temperature balance algorithm in accordance with an embodiment of the invention.

FIG. 4 shows an active temperature balance algorithm 173 for execution by an FCIM microprocessor (e.g., $\mu$P 80 of the FCIM 62 of FIG. 2). The FCIM 62 obtains RTD temperature information for each of the bridge cells (e.g., SCRs 12 of FIG. 1) from each of the BCMs 64,66 through scheduled (e.g., periodic) bridge data requests on the communication channels 86,88. Hence, all of the RTD temperatures are available for each of the bridges.

First, at 174, the active temperature balance algorithm 173 calculates the average temperature of all of the parallel cells in all of the bridges that are running. This provides the average temperature of all RTDs for all parallel cells in each of the bridges. Hence, this provides six "fair share" temperatures: (1) AP fair share, (2) BP fair share, (3) CP fair share, (4) AN fair share, (5) BN fair share, and (6) CN fair share. For example, for FIG. 1, AN fair share is the average of the temperatures for the RTDs (not shown) corresponding to AN1 and AN2. Similarly, CP fair share is the average of the temperatures for the RTDs 186CP1 and 186CP2 corresponding to CP1 and CP2, respectively. The other "fair share" temperatures are calculated in a similar manner.

Steps 175,176,177,178,180,182,184 of the algorithm 173 are executed for each of the RTDs of each of the bridges. For simplicity of illustration, only one particular RTD/SCR is considered. At 175, it is determined whether the particular RTD temperature is greater than a threshold value. Preferably, an adjustable minimum threshold temperature is employed in order that this threshold temperature is exceeded before the active temperature balance algorithm 173 functions to adjust the skip fire value for the corresponding SCR. Hence, if the particular RTD temperature is not greater than the threshold value, then the algorithm 173 exits at 177. In practice, no SCR skipping occurs until the temperature of the hottest RTD exceeds the minimum threshold temperature at 175. For example, a typical value of about 50° C. is employed as the threshold temperature, although a wide range of threshold temperatures may be employed.

Preferably, once the skipping starts, it does not stop until the bridge is shut down. The system does not stop skip firing even though an individual bridge might stop skipping if it is running too cool. For example, if one bridge has fans running, then it may likely be cooler than the other bridge(s) and it is likely that skipping in this one bridge will stop.

In turn, each RTD temperature is compared to the corresponding fair share temperature. At 176, it is determined if the particular RTD temperature is greater than the corresponding fair share temperature. For example, in a three-bridge system, if the RTD corresponding to BP3 (not shown) is employed, then that particular RTD temperature is compared to BP fair share, which is the average of the temperatures for the RTDs corresponding to BP1, BP2, and BP3. If the particular RTD temperature is greater than the corresponding fair share temperature, at 176, then the skip fire value is decreased by one count at 178. This increases the skip frequency (e.g., from one time out of N, to one time out of N−1). On the other hand, if the particular RTD temperature is less than the corresponding fair share temperature, at 176, then the skip fire value is increased by one count at 180, before the algorithm 173 exits at 177. This decreases the skip frequency (e.g., from one time out of N, to one time out of N+1).

Following 118, at 182, it is determined if the particular RTD temperature is greater than 133% of the corresponding fair share temperature, and if the skip fire reference is greater than $34_{10}$ (i.e., 22H). If so, then the skip fire reference is set to $34_{10}$ (i.e., 1 skip out of 34 counts) at 184. This recalibrates the skip fire reference by putting it at a suitable value where changes of one count make a larger percentage difference in the current and, therefore, the temperature of the heat sink (not shown) for the corresponding SCR. This allows a skip fire reference value, which would be too large, to be re-calibrated. Otherwise, it would take too long for that value to return to a range that would allow it to be effective. Following 184, or if the test is false at 182, the algorithm 173 exits at 177. Although exemplary values of 133% and 22H are disclosed, a wide range of such values may be employed.

EXAMPLE 1

The exemplary skip fire reference value of 22H ($34_{10}$) is employed in order to provide a skip fire value, which allows skipping to become effective relatively quickly. The normal schedule takes about 10 seconds for the FCIM to get the bridge information, to process that information, and to send new skip fire values to the bridges. In other words, it takes about one minute (i.e., six 10-second intervals) to change the skip fire value by six counts. Although a 10-second period is disclosed, a wide range of interval values may be employed. For example, the periodic schedule may be adjusted through user input.

EXAMPLE 2

The exemplary skip fire value of FFH ($255_{10}$) is the largest 8-bit skip fire value sent to the BCMs. When a BCM receives this skip fire value for a cell, it disables skipping to that cell. A wide range of skip fire reference values, maximum skip fire values and bit counts may be employed.

EXAMPLE 3

If, for example, an SCR requires skipping every fourth firing time, then it would take approximately five minutes (i.e., 30 10-second intervals) to decrement to four counts from 34 counts at 10 seconds per count. Otherwise, if a skip fire reference value of FFH ($255_{10}$) would be employed, then it would take more than 40 minutes (i.e., more than 240 10-second intervals) for the skip fire value to be adjusted to its desired value in this example.

EXAMPLE 4

When three or less bridges are running, then each bridge is given six opportunities to skip fire, in order that all of its cells can skip. The FCIM sends the BCM the bridge number of the bridge that is to skip in the firing command. The bridges which are not given the skip fire turn do not skip and, hence, carry current according to their natural balance. Because one or two bridges are always "not skipping," the output voltage is maintained in the proper manner, and the cells are always available to conduct. In this mode, each cell in each bridge can skip approximately 30% of the time, meaning that approximately 30% unbalance can be regulated out.

EXAMPLE 5

When more than three bridges are running, the bridges are split into two skip fire groups. Each group of bridges is allowed six opportunities to skip fire. The group that is not skip firing will conduct and, hence, the output voltage is maintained. The groups are created by the FCIM by determining how many bridges are running. The FCIM then divides the count of bridges by two. The first group includes the bridges with the lower bridge numbers. The second group includes the bridges with the higher bridge numbers. The FCIM tells each BCM its group number. When skipping starts, the FCIM sends out the group number of the bridges in the actual firing command, in order to identify the group of bridges, which are to skip fire.

Figure 5A:
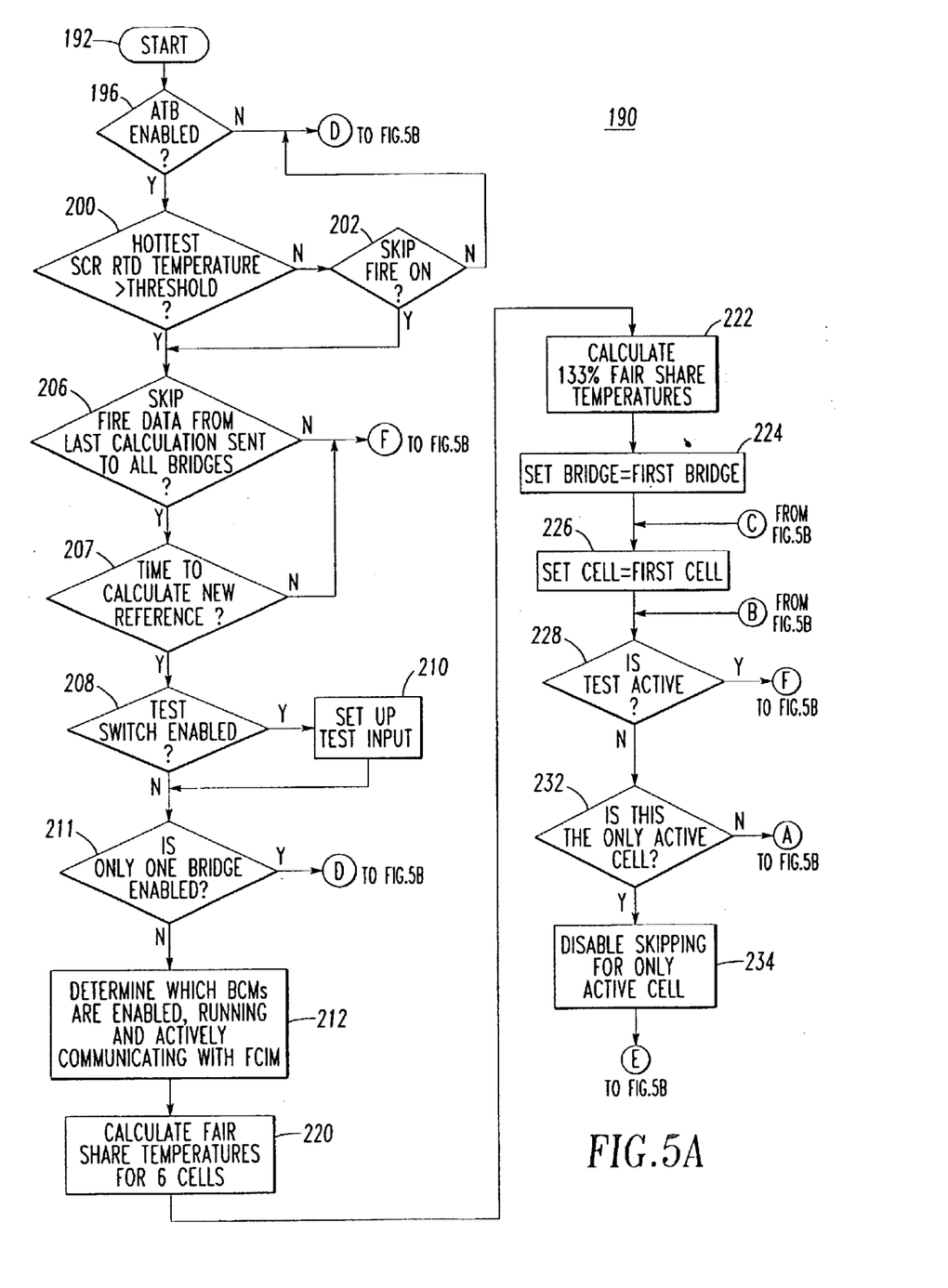
FIGS. 5A–5B are a flow chart of an active temperature balance algorithm in accordance with an embodiment of the invention.
Figure 5B:
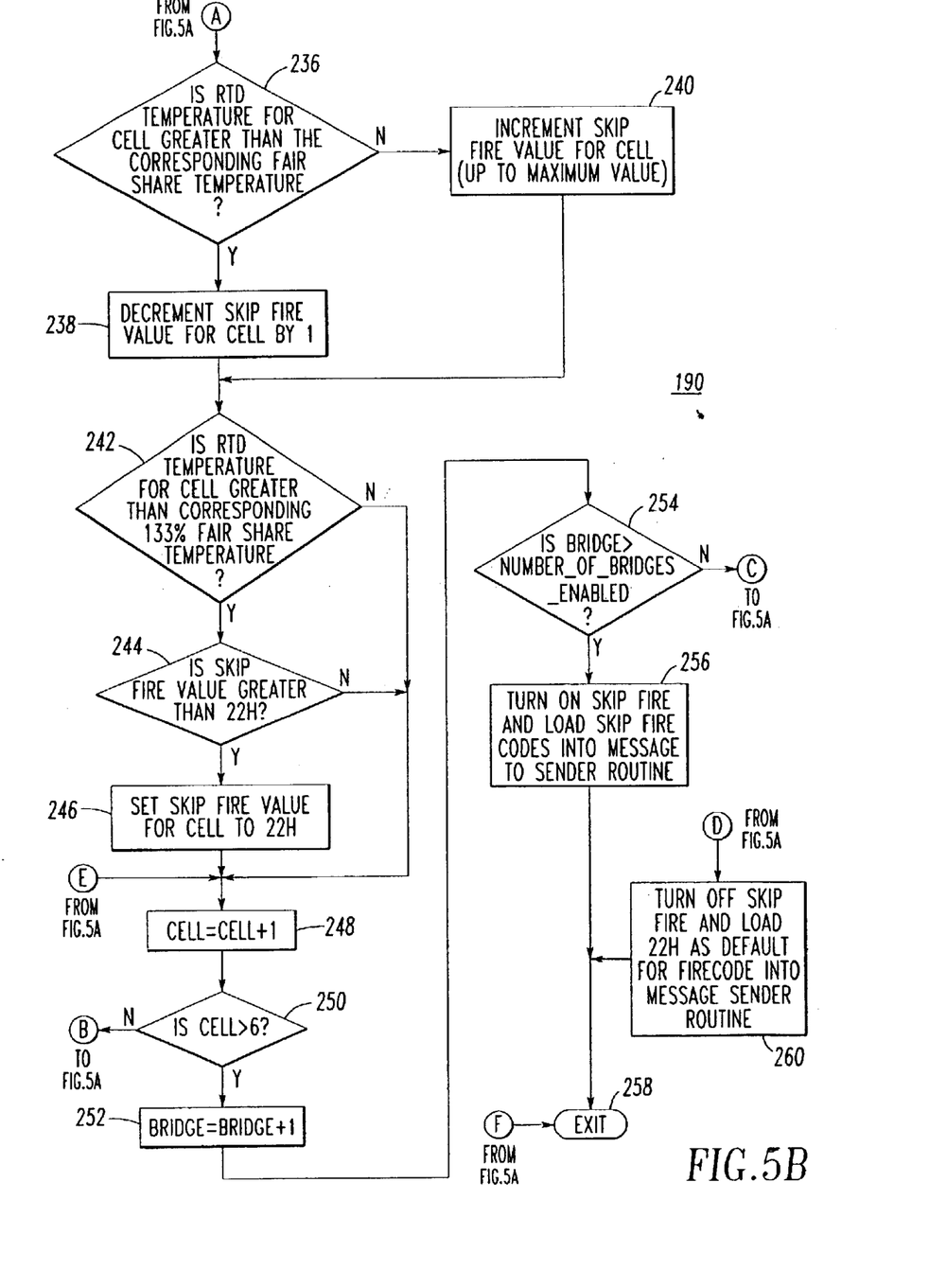

FIGS. 5A–5B show an active temperature balance algorithm 190 for execution by an FCIM microprocessor (e.g., $\mu$P 80 of the FCIM 62 of FIG. 2). After starting at 192, at 196 of FIG. 5A, it is determined if an Active Temperature Balance (ATB) block input or switch (e.g., set "true" or "false") (not shown) is turned on. If not, execution resumes at 260 of FIG. 5B. Otherwise, at 200, it is determined if the RTD temperature for the hottest SCR is greater than a threshold (e.g., about 50° C.). Preferably, once turned on, skip firing does not shut off even if the hottest SCR temperature drops below the temperature threshold. If the test at 200 is false, then at 202, it is determined if skip fire is on. If so, then execution resumes at 206. Otherwise, execution resumes at 260 of FIG. 5B. At 206, it is determined if the skip fire data from the last calculation was sent to all of the bridges. For example, data is not sent to the BCMs under various circumstances: (1) if skip fire is turned off; (2) if only one bridge is running, then skip fire stops; (3) new data is not sent to the BCMs until they have received all the old data; and/or (4) if a timer from the last calculation is not timed out.

If the skip fire data has not yet been sent, then the algorithm 190 exits at 258 of FIG. 5B. Otherwise, at 207, it is determined if it is time to calculate a new reference (e.g., based upon a periodic timer). If not, then the algorithm 190 exits at 258 of FIG. 5B. Otherwise, at 208, it is determined if a test switch (e.g., set "true" or "false") (not shown) is enabled. If the test switch is set, then a suitable test input is set up (e.g., for field testing by design engineering) at 210, in order to check the skip fire operation. For example, the user may enter skip fire codes directly into the memory (not shown) of the microprocessor 80 of the FCIM 62 of FIG. 2. In turn, these skip fire codes are sent to the BCMs.

If the test switch is not enabled or after 210, then at 211, it is determined if only one (or none) of the plurality of bridges is enabled. If so, then execution resumes at 260 of FIG. 5B. For example, skip firing may be shut off until suitable conditions are satisfied, such as, for example, more than one bridge is running. If plural parallel bridges are enabled, then at 212, it is determined which BCMs are: (1) enabled, (2) running, and (3) actively communicating with the FCIM, in order to determine the bridges on which skip firing is implemented. BCMs are enabled based on the number of bridges, which the system is configured to have. The enabled state is a user settable input. Whether a bridge is running is determined by a hit set in data sent to the FCIM from the BCM. An active communication link with the BCM is determined from a value, which the BCM periodically sends to the FCIM. The FCIM decrements this value, in order to eventually set it to zero. If the BCM does not timely re-send its value to the FCIM, then the count will reach zero and the communication link is no longer active. Next, at 220, six fair share temperatures are calculated by employing all of the RTD temperatures from all of the bridges. Consideration may be given, however, to non-functional RTDs and/or to the state of the conduction monitors. Normally, however, all RTDs are functioning and, thus, all RTD temperatures are employed.

Next, at 222, the six values of 133% fair share temperatures are calculated from the six corresponding fair share temperatures. Then, at 224 and 226, the value Bridge is set to the first bridge (e.g., 0 or 1) and the value Cell is set to the first cell. For example, the value Bridge may correspond to one of two, three, four or more parallel bridges. Similarly, the value of Cell may correspond to one of the six elements (or corresponding RTDs) of a bridge (e.g., 1=AP1, 2=AN1, 3=BP1, 4=BN1, 5=CP3, 6=CN3). The Cell values are assigned in the BCM.

Then, at 228, it is determined if the test mode, as detected at 208, is active. If so, then the algorithm 190 exits at 258 of FIG. 5B. In this instance, calculations in the FCIM to adjust the SCR temperatures stop, and the skip fire setpoints for each SCR in each bridge are entered manually.

Otherwise, at 232, it is determined if the present cell (corresponding to the value of Cell) is the only active (e.g., based upon the corresponding conduction monitor value) cell among the other parallel elements. If so, then at 234, the corresponding skip fire code is disabled (e.g., set to FFH), in order to disable skipping for that only active cell, before execution resumes at 248 of FIG. 5B.

On the other hand, if there are plural active cells, then, at 236 of FIG. 5B, it is determined if the RTD temperature for the present cell is greater than the corresponding fair share temperature. If so, then the RTD temperature is too hot and it is desired to skip more by decreasing the skip fire reference. Hence, at 238, the skip fire value for the Cell is decreased by one in order to increase the skip frequency. On the other hand, if the RTD is too cool, then the corresponding SCR may carry more current. This is accomplished by skipping less and by increasing the skip fire reference. Thus, at 240, the skip fire value for the Cell is increased by one, up to a suitable maximum value (e.g., FFH), in order to decrease the skip frequency.

After either 238 or 240, it is determined if the temperature of the RTD for the present Cell is greater than the corresponding 133% fair share temperature at 242. If so, then it is determined if the skip fire value for the present Cell is greater than 22H (or, for example 1 skip out of a count of more than 35) at 244. If so, then the skip fire value for the present Cell is set to 22H (i.e., 1 skip out of 34 counts) at 246. If either one of the tests at 242 or 244 is false, or after 246, then the value of Cell is incremented by one at 248.

Next, at 250, it is determined if the value of Cell is greater than six. If not, then step 228 of FIG. 5A is repeated with the next value of Cell. On the other hand, if the value of Cell is greater than six, then the value of Bridge is incremented by one at 252. Next, at 254, it is determined if the value of Bridge is greater than the value Number_Of_Bridges_Enabled (e.g., if First Bridge is represented by "0", then this number is one or more; if First Bridge is represented by "1", then this number is two, three, four or more). If not, then step 226 of FIG. 5A is repeated with the next value of Bridge (for the first value of Cell). Otherwise, if the value of Bridge is greater than the number enabled, then, at 256, skip fire is turned on and the skip fire codes for the six cells for each of the bridges are loaded into a message to a FCIM communication sender routine (not shown) for the BCMs. This routine sends the new skip fire codes for the corresponding cells to the corresponding bridges. Finally, at 258, the algorithm 190 exits. If ATB was not enabled at 196 of FIG. 5A or if only one bridge is enabled, then at 260 of FIG. 5B, skip fire is turned off and the value of 22H is loaded as the default for the fire code into the FCIM communication sender routine. After 260, the algorithm exits at 258. The algorithm 190 is preferably periodically executed. Examples of systems employing skip firing are disclosed in U.S. Pat. Nos. 5,963,440 and 5,963,441, which are incorporated by reference herein.

Although conduction monitors 28A,28B,28C are disclosed, any suitable circuit (e.g., without limitation, blown fuse indicator contacts; circuit interrupter auxiliary contacts), which detects an open circuit condition of the circuit interrupter fuses or contacts, such as 10A, 10B, 10C, may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A control system comprising:

a firing control circuit outputting a plurality of firing commands;

a parallel array of a plurality of rectifier bridges, each of said rectifier bridges converting a plurality of alternating current voltages from a plurality of alternating current phases to a voltage, each of said rectifier bridges comprising a plurality of segments, each of said segments having an element, each of the elements of one of said rectifier bridges having a temperature and being electrically interconnected in parallel with at least a corresponding one of the elements of the other of said rectifier bridges;

a plurality of temperature sensors, each of said temperature sensors sensing the temperature of a corresponding one of said elements;

a plurality of bridge control circuits, each of said bridge control circuits inputting one of the firing commands, outputting a plurality of control signals responsive to said one of the firing commands to repetitively fire at least some of said elements of a corresponding one of said rectifier bridges, and inputting the sensed temperatures of said elements of the corresponding one of said rectifier bridges;

a communication channel communicating the input sensed temperatures from the bridge control circuits to the firing control circuit, and communicating the firing commands from the firing control circuit to the bridge control circuits; and an output having said voltage, wherein said firing control circuit includes means for averaging some of the input sensed temperatures to provide a corresponding average temperature for each of the parallel elements of said rectifier bridges, for comparing one of the input sensed temperatures to the corresponding average temperature, for skipping repetitive firing of at least one of said elements for one out of a plurality of counts, for increasing said counts when the input sensed temperature of one of said at least one of said elements is less than the corresponding average temperature or for decreasing said counts when the input sensed temperature of said one of said at least one of said elements is greater than the corresponding average temperature, and for setting said counts to a first predetermined value when the input sensed temperature of said one of said at least one of said elements is greater than a second predetermined value above said corresponding average temperature.

2. The control system of claim 1 wherein said means for averaging includes a processor and a routine setting said counts to the first predetermined value when a count of said counts is greater than said first predetermined value.

3. The control system of claim 1 wherein said elements are semiconductor devices.

4. The control system of claim 3 wherein said semiconductor devices are thyristors or SCRs.

5. The control system of claim 1 wherein said means for averaging includes a processor and a routine to compare each of the input sensed temperatures to a threshold temperature and to responsively enable said increasing or said decreasing whenever any of said input sensed temperatures exceeds said threshold temperature.

6. The control system of claim 5 wherein said routine disables said skipping until after any of said input sensed temperatures exceeds said threshold temperature.

7. The control system of claim 5 wherein said threshold temperature is about 50° C.

8. The control system of claim 1 wherein said means for averaging includes a processor and a routine to increment said counts by one when the input sensed temperature of said one of said at least one of said elements is less than the corresponding average temperature.

9. The control system of claim 1 wherein said means for averaging includes a processor and a routine to decrement said counts by one when the input sensed temperature of said one of said at least one of said elements is greater than the corresponding average temperature.

10. The control system of claim 1 wherein said second predetermined value above said corresponding average temperature is about 33% above the corresponding average temperature.

11. The control system of claim 2 wherein said first predetermined value is a count of 34; and wherein a maximum value of said plurality of counts is 255.

12. The control system of claim 2 wherein said routine disables repetitive firing of said at least one of said elements when a count of said counts is a maximum value.

13. The control system of claim 11 wherein said routine increments said counts by one when the input sensed temperature of said one of said at least one of said elements is less than the corresponding average temperature.

14. The control system of claim 11 wherein said routine decrements said counts by one when the input sensed temperature of said one of said at least one of said elements is greater than the corresponding average temperature.

15. The control system of claim 1 wherein said voltage of said output is a direct current voltage.

16. A method for controlling a parallel array of a plurality of rectifier bridges, each of said rectifier bridges converting a plurality of alternating current voltages from a plurality of alternating current phases to a voltage, each of said rectifier bridges comprising a plurality of segments, each of said segments having an element, each of the elements of one of said rectifier bridges having a temperature, being electrically interconnected in parallel with at least a corresponding one of the elements of the other of said rectifier bridges, and being responsive to a control signal, said method comprising:

outputting the control signals to repetitively fire said elements;

skipping repetitive firing of at least one of said elements for one out of a plurality of counts;

sensing the temperatures of said elements;

averaging some of the sensed temperatures to provide a corresponding average temperature for each of the parallel elements of said rectifier bridges;

comparing one of the sensed temperatures to the corresponding average temperature;

increasing said counts when the sensed temperature of one of said at least one of said elements is less than the corresponding average temperature, or decreasing said counts when the sensed temperature of said one of said at least one of said elements is greater than the corresponding average temperature; and setting said counts to a first predetermined value when the sensed temperature of said one of said at least one of said elements is greater than a second predetermined value; above the corresponding average temperature.

17. The method of claim 16 further comprising:

setting said counts to the first predetermined value when a count of said counts is greater than said first predetermined value.

18. The method of claim 16 further comprising:

comparing each of the sensed temperatures to a threshold temperature and conditionally starting said decreasing or said increasing whenever any of said sensed temperatures exceeds said threshold temperature.

19. The method of claim 16 further comprising:

adjusting said threshold temperature.

20. The method of claim 16 further comprising:

disabling said skipping until after any of said sensed temperatures exceeds said threshold temperature.

21. The method of claim 16 further comprising:

incrementing said counts by one when the sensed temperature of said one of said at least one of said elements is less than the corresponding average temperature.

22. The method of claim 16 further comprising:

decrementing said counts by one when the sensed temperature of said one of said at least one of said elements is greater than the corresponding average temperature.

23. The method of claim 16 further comprising:

setting a count of said counts to a maximum value and disabling repetitive firing of at least one of said elements.

24. The method of claim 18 further comprising:

enabling said skipping after any of said sensed temperatures exceeds said threshold temperature and independent of any subsequent sensed temperatures.

25. A method for controlling a parallel array of a plurality of rectifier bridges, each of said rectifier bridges converting a plurality of alternating current voltages from a plurality of alternating current phases to a voltage, each of said rectifier bridges comprising a plurality of segments, each of said segments having an element, each of the elements of one of said rectifier bridges having a temperature, being electrically interconnected in parallel with at least a corresponding one of the elements of the other of said rectifier bridges, and being responsive to a control signal, said method comprising:

outputting the control signals to repetitively fire said elements;

skipping repetitive firing of at least one of said elements at a skip frequency;

sensing the temperatures of said elements;

averaging some of the sensed temperatures to provide a corresponding average temperature for each of the parallel elements of said rectifier bridges;

comparing one of the sensed temperatures to the corresponding average temperature;

decreasing said skip frequency when the sensed temperature of one of said at least one of said elements is less than the corresponding average temperature, or increasing said skip frequency when the sensed temperature of said one of said at least one of said elements is greater than the corresponding average temperature; and setting said skip frequency to a predetermined skip frequency value when the sensed temperature of said one of said at least one of said elements is greater than a predetermined value above the corresponding average temperature.

26. The method of claim 25 further comprising:

setting said skip frequency to said predetermined skip frequency value when aid skip frequency is less than said predetermined skip frequency value.

* * * * *